Patented Nov. 18, 1952

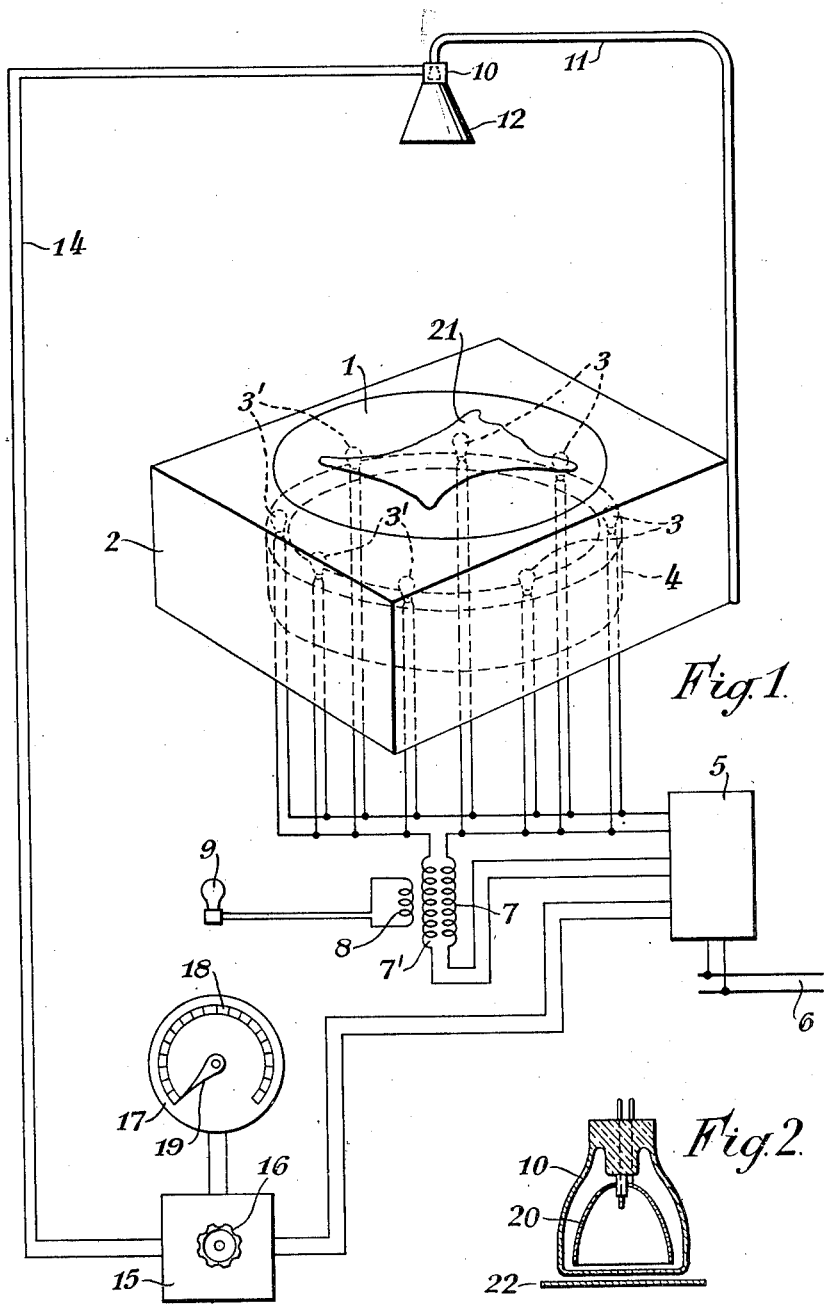

2,618,752

UNITED STATES PATENT OFFICE 2,618,752

MEASURING APPARATUS

Alec Peter Besson, London, England, assignor to Londex Limited, London, England, a British company Application February 24, 1949, Serial No. 78,157
In Great Britain February 28, 1948

4 Claims. (Cl. 250—220)

This invention relates to apparatus for measuring the area of non-transparent sheet like work-pieces of irregular shape, e. g. pieces of leather, and has for its main object to provide a measuring apparatus in the accurate operation of which the human factor is practically eliminated.

Another object is to provide a measuring apparatus of quick action which permits instantaneous, accurate readings.

Yet another object is to employ photoelectric means, a luminous background arranged to be obscured by the work-piece the area of which is to be determined, and means for measuring the output of the photoelectric means, the arrangement being such that the said output is in proportion to the extent of the unobscured area of the luminous background.

Another object is to impart to the background for the work-piece which is to be measured a luminosity which is so graded that the light rays emitted from equal areas at different points of the luminous background have similar effects on the photoelectric means.

Yet another object is to make the measuring means responsive to signals of the photoelectric means which are initiated by flickering light only so that extraneous light from non-flickering sources, e. g. daylight, has no influence on the correct operation of the measuring means.

Another object is to illuminate the background by a number of ordinary filament lamps and to provide means for automatically indicating any lamp failure so as to avoid measurements being carried out whilst the background is not correctly illuminated.

Other features of the invention will be apparent and the invention will be better understood from the following description referring to the drawings which illustrate diagrammatically and by way of example in Fig. 1 a preferred embodiment of an apparatus according to the invention and in Fig. 2 constructional details of a photoelectric cell that has been found suitable to serve in such an apparatus as a unitary photoelectric means.

The luminous background 1 is provided by the surface of a glass plate forming the top cover of a table or casing 2. Only a circular part of the glass plate is translucent and opaline, e. g. frosted or sprayed with paint. It serves to support the piece 21 of non-transparent material, e. g. leather, whose surface is to be measured. For the illumination of the surface 1 several single coil gas filled filament lamps 3, 3' are arranged in the casing 2 on a support 4, underneath the surface 1, evenly distanced from each other on a circle which is coaxial with and of approximately the same diameter as the circular surface 1. Advantageously the distance between the lamps is essentially equal to the distance between each lamp and the surface 1. The sides of the casing and the corner sections of its top plate are non-transparent.

Two equal groups 3, 3' of the lamps are each separately fed from a constant voltage supply, e. g. a suitable transformer 5 which is connected to a main supply line 6. Mutually opposed windings 7, 7' each in series with one of the two groups of lamps are arranged to produce no resultant flux under normal operating conditions, and to co-operate with a third winding 8 which supplies current to a signalling or alarm device, e. g. a lamp 9, when failure of a lamp in one of the two groups brings the two windings 7, 7' out of balance, so that the winding 8 is energized. In addition to, or instead of, the signal device 9 a relay may be provided to perform any desired switching operation, e. g. to disconnect all or part of the apparatus when lamp failure occurs.

A single photoelectric cell 10 is supported by a bracket 11 to be coaxial with the circular luminous surface 1 and is screened by a frustoconical mask 12 from the access of light coming from sources other than the luminous surface 1.

The photoelectric cell is preferably of an emissive type. Its cathode 20 is planar or approximately parabolical as shown in Fig. 2 and has preferably a surface layer containing antimony, or ceasium, or both, as is known in the art. An opalescent screen 22, e. g. a glass disc sprayed evenly and thinly with white colour, can be arranged in front of and as near as possible to the photoelectric cell, to increase still more the uniformity of the light effect derived from the surface 1.

To ensure correct operation the distance of the photoelectric cell from the luminous surface must be a function of the diameter of the surface of the distance of the lamps from the surface, the proportions being so co-related that the differences in light intensity at the various points of the surface 1, due to the different distance of these points from the various lamps 3, 3', and the different angles of incidence of the light rays, are suitably compensated by the distance and the position of these points relative to the photoelectric cell. It will be understood that this function can be more readily and accurately computed for a circular luminous surface co-operating with a single photoelectric cell arranged at a suitable perpendicular distance from the centre point of the luminous surface than for any other shape of the luminous surface or relative position of the lights and the photoelectric cell. The present invention, however, is not limited to this most suitable arrangement, as it will be obvious to the expert that other equivalent arrangements are possible and within the scope of this invention. Such other arrangements may comprise for example luminous surfaces which are not circular, for instance oval, square or rectangular; or may comprise more than one photoelectric cell. In the latter case several photoelectric cells can be arranged near the luminous surface, e. g. beneath the surface which serves to support the work-piece, and partition walls can be provided between the cells, whilst the light source may comprise a single lamp arranged above the luminous surface, e. g. in the position shown in the drawing for the cell 10, so that the piece which is to be measured obscures a corresponding portion of the luminous surface.

The output of the light cell 10 is preferably amplified and rectified before being measured. Conductors 14 therefore connect the cell 10 to the input terminals of an amplifier 15 of conventional construction, whose sensitivity is adjustable, e. g. by a control handle or knob 16. The output of the amplifier 15 is applied to the measuring instrument 17, e. g. a micro-ammeter, whose dial is so graduated that by suitably adjusting the sensitivity control 16 the pointer 19 can be brought to a zero mark of a scale 18 of the instrument when no part of the luminous surface is obscured, and that the area of any obscured portion of the luminous surface, i. e. the area of the non-transparent work-piece piece 21, is indicated on the scale 18 by the pointer 19. The sensitivity of the instrument can be adjustable as is known in the art.

In order to eliminate measuring errors which may be caused by daylight or other foreign light reaching the photoelectric cell it is advisable to use for the illumination of the surface 1 a light source whose intensity varies cyclically, e. g. with 60 cycles of a main supply voltage. It has been found that ordinary single coil filament lamps fulfill this requirement. Thus alternating current whose magnitude varies with the free area of the luminous surface is passed through or emitted by the photoelectric cell, and can be filtered through capacitors which stop direct current, due to non-flickering foreign light, e. g. daylight. Any other flickering light sources may be used and a filter tuned to the frequency of the flicker may be inserted in the amplifying equipment, although this has not been found necessary in practical applications.

It will be understood that constructional details can be varied without departure from the invention. Any number of lamps may be used and the lamp or lamps may be combined with reflectors, lenses or screens, to achieve the required grading of the luminosity. A semi-circular luminous table, for instance, may be illuminated by lamps arranged below the arched periphery and a mirror may be provided below the straight side of the table to simulate the effect of the opposite half circle of lights.

Having thus described my invention, what I claim as new and desire to secure by Letters Patent is:

1. An apparatus for measuring the area of a non-transparent sheet like article including a luminous surface forming a substantially planar support and background for the article, a light sensitive cell, and a source of light arranged at opposite sides of the said surface and the article resting upon it, the use as light source of a plurality of lamps of substantially equal light intensity arranged on a circle only whose centre is on a line through the said cell, perpendicular to the said surface, the arrangement being such that the quantities of light received along concentric circles of the luminous surface decrease from the outer circles towards the inner circles, while the proportion of light received by the said cell from points on the said circles increases as compared with the total quantity of light received at each of the said points, to ensure that portions of equal area of the luminous surface at different locations cause similar effects of the light sensitive cell.

2. In an apparatus as claimed in claim 1 the connection of the lamps in two groups so as to form normally equal electric loads, and the connection of each of the two groups to one of two mutually opposing windings, a third winding responsive to the field of the two mutually opposing windings being connected to a means for indicating unbalance between the two opposing windings, due to the failure of a lamp in one of the two groups of lamps.

3. An apparatus as claimed in claim 1 wherein the electric lamps are of a single coil gas filled filament type and are connected to a source of alternating current.

4. An apparatus for measuring the area of non-transparent sheet-like pieces including a light sensitive cell cooperating with a luminous surface which forms a background for the piece whose area is to be measured wherein the luminous surface is substantially planar and of circular shape, the light sensitive cell is arranged co-axially with said surface at one side thereof, electric lamps at the other side of the luminous surface are evenly distanced from one another and arranged solely on a circle which is co-axial with and substantially of the same diameter as the circular luminous surface, the distances between the lamps, the luminous surface, and the light sensitive cell being so correlated that the quantities of light received by points along concentric circles of the luminous surface decrease from the outer circles towards the inner circles, while the proportion of light received by the said cell, as compared with the total quantity of light received by each point individually is higher for points on inner circles and lower on points on the outer circles, so that the variations in the total light quantities and the proportions of the latter which reach the cell neutralize each other, and equal areas of the luminous surface at different locations thereof cause similar responses of the light sensitive cell, and wherein the electric lamps are connected in two groups in series with two mutually opposed windings, a third winding being arranged in the field of the two windings to respond to unbalance of the said two windings, thereby to indicate the failure of a lamp in one of the two groups, and facilitate the maintenance of the said correlationship.

ALEC PETER BESSON.

REFERENCES CITED

The following references are of record in the file of this patent:

UNITED STATES PATENTS

| Number | Name | Date |
| --- | --- | --- |
| 1,997,712 | Bauer | Apr. 16, 1935 |
| 1,149,958 | Fox | Mar. 7, 1939 |
| 2,179,000 | Tea | Nov. 7, 1939 |
| 2,294,515 | Senauke et al. | Sept. 1, 1942 |
| 2,317,024 | Bliss | Apr. 20, 1943 |
| 2,372,173 | Bodde, Jr. | Mar. 27, 1945 |
| 2,404,448 | Martin | July 23, 1946 |
| 2,474,828 | Connelly et al. | July 5, 1949 |